RECORD PLAYING DEVICE

Filed Dec. 8, 1965

INVENTORS
Renato Tiraboschi and
Oreste Tiraboschi
BY
Michael S. Striker
Attorney

RECORD PLAYING DEVICE

Filed Dec. 8, 1965

INVENTORS
Renzo Tiraboschi and
Oreste Tiraboschi
BY
Michael S. Striker
Attorney 3,446,505
RECORD PLAYING DEVICE
Renato Tiraboschi and Oreste Tiraboschi, both of Viale Adda I, Lecco, Coma, Italy
Filed Dec. 8, 1965, Ser. No. 512,497
Claims priority, application Italy, May 7, 1965, 10,444/65
Int. Cl. G11b *25/04*
U.S. Cl. 274—1 13 Claims This invention relates to a record playing device which is particularly adapted to be incorporated in portable phonographs and which due to its exceptionally advantageous features can also be used in motorcars.

Because of its mechanical and functional features, the record playing device proposed by the invention may also be used in other sound reproducing apparatus, such as e.g. juke boxes.

The electromechanical device employed by this invention is distinguished from any other similar devices by the simple construction and functioning of the individual component parts thereof.

These features permit the realization of particularly light-weight phonographs and electromechanical sound reproducing apparatus. In other words, the record playing device claimed is particularly adapted to be used in portable phonographs, and to be transistorized.

An embodiment of the invention will now be described by way of example and with reference to the accompanying drawings, in which.

Figure 4:
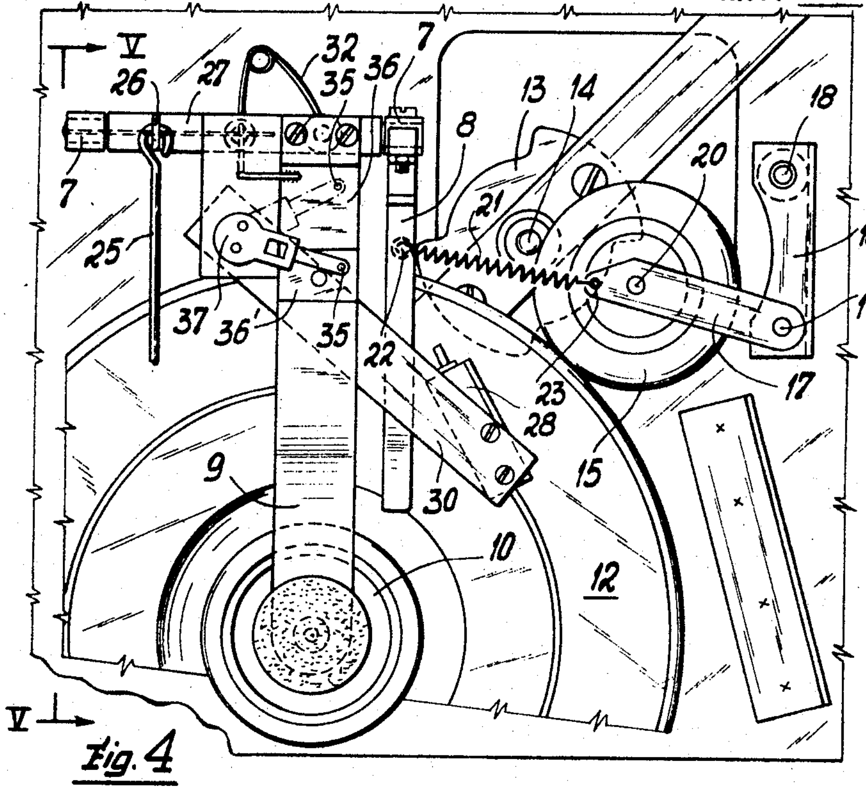
Figure 5:
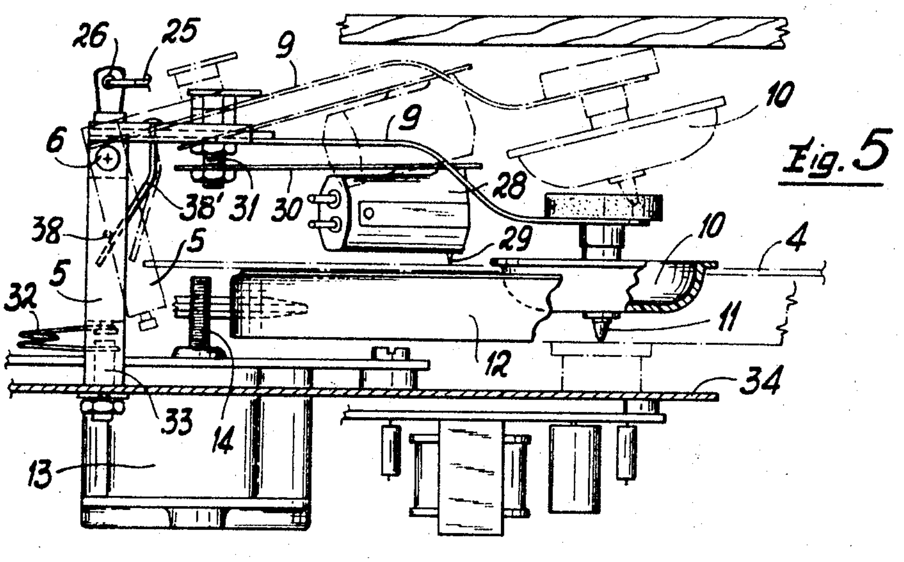

FIG. 4 a top plan view, on an enlarged scale, of the principal kinematic elements and the electromechanical system constituting the substance of the invention, and FIG. 5 a fragmentary section taken on the line V—V of FIG. 4.

The subject matter of the present invention is constituted by an electromechanical device capable of functioning as a record player and susceptible of being applied to the frame of a particular phonographic apparatus or to an automatic sound reproducer, also of the coin-operated type.

With reference now to the drawings, the electromechanical device according to the invention is shown to be incorporated in a sound box 1 of the portable type provided with a slot 2 in one of its side walls 3.

The slot 2 is so shaped and dimensioned as to permit a phonographic record 4 to be easily introduced into the box 1.

When the record 4 is pushed into the slot 2 it will exert a pressure on a first lever 5 (FIG. 5) connected with a linkage and pivotable about a fixed axle 6 mounted at its ends in a pair of spaced supports 7 (FIG. 4).

One of the supports 7 mounts an auxiliary guide 8 of preferably laminar conformation which function it is to guide the phonographic record 4 when this is being introduced into the box 1 of the record player through the slot 2.

The first lever 5 is also connected with a first arm 9 of preferably laminar resilient construction and carrying a record centering collar 10 (FIG. 5). The collar 10 can be swung to a limited extent about the axle 6 together with the arm 9 and the first lever 5 and serves to automatically center and locate a phonographic record, such as the record 4, which has been introduced into the box 1 through the slot 2. Such automatic record centering and locating action of the collar 10 is due to its dished configuration and to a centering pin 11 projecting from its underside and adapted to penetrate a turntable 12 during operation of the record player. The collar 10 is also provided with an end flange preventing the record from wandering out of true and from vibrating even when the record player is tilted during operation.

For rotating the turntable 12 an electric motor 13 is provided which has a drive shaft 14 for transmitting rotary motion to a disk 15 in resilient frictional engagement therewith and, at the same time, also with the turntable 12. The friction disk 15 thus can transmit rotational motion from the drive shaft 14 to the turntable 12 and is so dimensioned as to drive the turntable 12 at reduced speed in relation to the speed of the drive shaft 14.

The friction disk 15 is carried by an arm 17 (FIG. 4) hinged at 19 to an arm 16 pivoted to a fixed pin 18. The arm 17 is provided intermediate its ends with a pin 20 rotatably mounting the disk 15. The resilient frictional engagement of the disk 15 with the drive shaft 14, on the one hand, and the turntable 12, on the other hand, is ensured by a spring 21 fixed at 22 to an element connected with the supporting frame 34 (FIG. 5) of the record player and at 23 to the arm 17.

The record player proposed by the invention is, furthermore, provided with record ejecting means including a push button 24 (FIG. 3) provided at one end of a rod 25 connected by its other end with a second lever 26 which in turn is rigidly connected with an element 27 rotatable about the axle 6.

Figure 1:
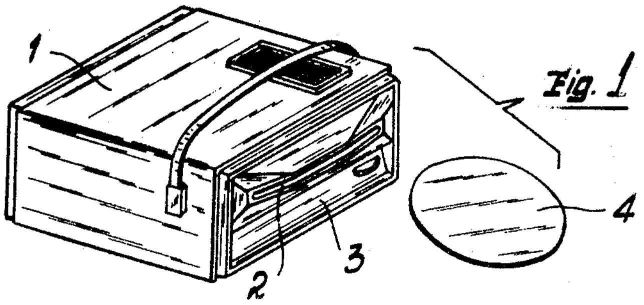
FIG. 1 is a perspective view of a phonographic device according to the invention and of a record.
Figure 2:
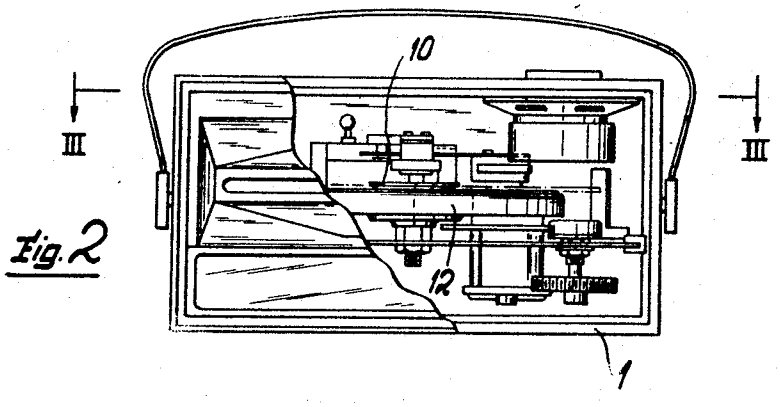
FIG. 2 is a front elevational view of the phonographic device seen in the direction of the arrows II—II of FIG. 3, with parts of the front wall broken away.
Figure 3:
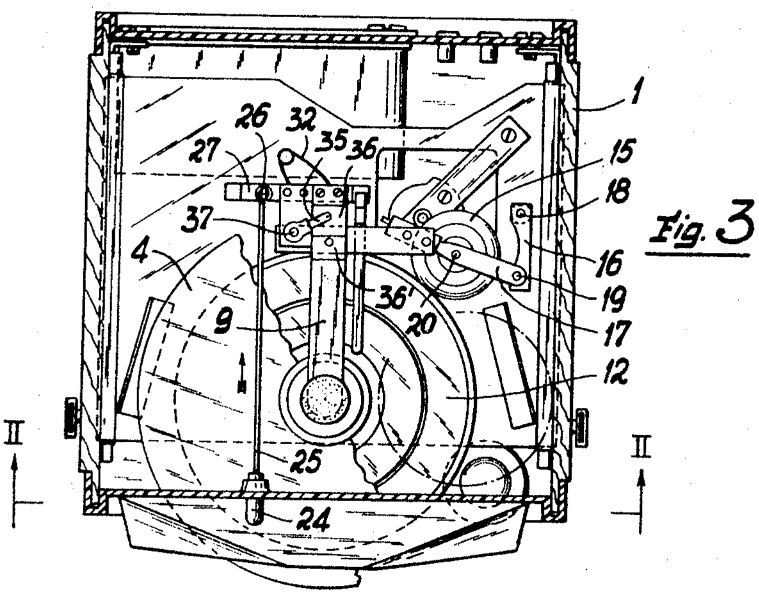
FIG. 3 is a sectional top plan view substantially taken on the line III—III of FIG. 2.

From an examination of FIGS. 3, 4 and 5 it will be readily understood that by pressing the push button 24 the first arm 9 is rotated together with the collar 10 about the axle 6 so that the collar 10 will be lifted off the record 4 and thus off the turntable 12. Together with the first arm 9 also the first lever 5 will rotate partly about the fixed axle 6, thereby to eject the record 4 from the box 1 through the slot 2. From the foregoing it is thus apparent that the expulsion of the record 4 can be effected by a simple manual operation, viz by pressing the push button 24.

The said electromechanical device is further provided with a movable phono pick-up 28 carrying a needle 29 and secured to a second arm 30 which is rotatable about a pivot 31. The arrangement is such that the arm 30 is automatically displaceable and when a phonographic record such as the record 4 is introduced into the slot 2 the first arm 9 is lowered and thus also the second arm 30 is lowered together with the phono pick-up 28 and the needle 29 which will engage into the sound groove in the record 4 next to the periphery thereof.

The lower end of the first lever 5 is connected with one end of a spring 32 having its other end fixed to a pin 33 secured to the supporting frame 34 to which the main parts of the electromechanical device are fixed.

The spring 32 urges the parts 5, 9, 10, 28, 29, 30 and 31 into one of two predetermined end positions corresponding to the maximum angular displacement of these parts.

The electromechanical device is also provided with switches for opening and closing a power supply circuit for the electric motor 13. Such a switch may be of the type shown in FIG. 5 and comprise two contact elements 38 and 38' which are open when the first arm 9 is in its raised or inoperative position represented by dot and dash lines, whereas when the arm 9 is in its lowered or operative solid line position of FIG. 5, the contact elements 38 and 38' are closed and the motor 13 is supplied with current from a battery or any other electric current source.

FIGS. 3 and 4 show a second switch which comprises a contact 35 provided at the free end of a third arm 37 which is rotatable about the pivot 31 and connected with the arm 30. Thus, rotation of the second arm 30 results in a corresponding rotation of the third arm 37 during which the contact 35 will slide on a surface consisting partly of a conductive metal section 36 and partly of an insulated section 36'. As long as the contact 35 slides or rests on the metal section 36 the power supply circuit for the motor 13 is closed and will automatically be opened as soon as the contact 35 reaches the insulated section 36' so that the power supply to the motor 13 is interrupted. This is exactly the case when the arm 30 has moved through a predetermined angle, i.e. when the needle 29 carried by the pick-up 28 is in a position corresponding to the inner end of the sound groove in the record 4. Thus it is possible automatically to control the disconnection of the motor 13 from the power source at the end of the record playing period.

It is self-evident, however, that the record player proposed by the invention may also be provided with interrupters of any other type.

The invention may be embodied in other specific forms without departing from the spirit or essential characteristics thereof. A preferred embodiment is therefore to be considered in all respects as illustrative and not restrictive.

We claim:

1. A record playing device particularly adapted to be incorporated in phonographic apparatus or sound reproducers, also of the coin operated type, comprising (a) a supporting frame having two sides, (b) a turntable mounted on one side of said supporting frame so as to be rotatable about an axis, (c) a motor for driving the turntable, (d) a pair of spaced supports mounted on one side of said supporting frame and extending outwardly therefrom, (e) a fixed axle mounted between said supports, (f) a first arm adjacent said turntable carrying at one of its ends a record centering collar and pivoted at its other end to said fixed axle so as to be rotatable thereabout through a pre-selected angle thereby to move said record centering collar into an inoperative position in which said collar does not hold a record on said turntable or into an operative position in which said collar holds a record on said turntable, (g) a pivot secured to said first arm so as to extend substantially parallel to the axis of rotation of said turntable, (h) a second arm (30) fulcrumed at one of its ends to said pivot and mounting at its other end a phono pick-up carrying a needle, and (i) a first lever pivoted to said fixed axle and connected with said first arm, said first lever being susceptible of being engaged and pivoted about said fixed axle by a record being placed on said turntable, thereby to pivot said first arm together with said second arm about said fixed axle and thus to take said record centering collar into said operative position and said needle carried by said phono pick-up to engage into the sound groove in said record placed on said turntable.

2. A record playing device as claimed in claim 1, wherein said second arm rotates about said pivot when said first arm is pivoted about said fixed axle in order to take said record centering collar into said inoperative position.

3. A record playing device as claimed in claim 1, wherein an electric motor with a drive shaft and a friction disk simultaneously engages said drive shaft and said turntable thereby to transmit rotary motion from said drive shaft to said turntable.

4. A record playing device as claimed in claim 3, wherein said friction disk is carried by an arm which is hinged to another arm pivoted to a fixed pin, the arm carrying said friction disk being connected to one end of a spring which is anchored at its other end to the supporting frame of the device and which urges said friction disk simultaneously into contact with said drive shaft and said turntable.

5. A record playing device as claimed in claim 1 and intended to be applied to a portable phonograph provided with a slot in one of its lateral walls which permits a record to be introduced into said phonograph, wherein an auxiliary means is provided for guiding a record introduced into said phonograph, said means being secured to said frame.

6. A record playing device as claimed in claim 5, wherein a push button is provided which is connected with a rod anchored to a lever fixed to an element rotatable about said fixed axle.

7. A record playing device as claimed in claim 6, wherein said element is connected with said first lever so that said first lever pivots about said axle into contact with said record when said push button is pressed for ejecting the record.

8. A record playing device as claimed in claim 1, wherein said motor is an electric motor with a drive shaft, a friction disk simultaneously engaging said drive shaft and said turntable thereby to transmit rotary motion from said drive shaft to said turntable, and a switch being provided with two contact elements, one of said contact elements being secured to one of said spaced supports and the other contact element being secured to said first arm so as to be rotatable therewith about said fixed axle in such a manner that when said record centering collar is in the lower or operative position said switch is closed and thus allows power to be supplied to said electric motor for driving said turntable.

9. A record playing device as claimed in claim 8, wherein a further switch is provided which includes a movable contact mounted to be rotatable about said pivot to which said second arm is fulcrumed, and a plane surface subdivided into a conductive metal section and an insulated section is disposed for cooperation with said movable contact, said movable contact being in sliding contact with said surface when being rotated about said pivot.

10. A record playing device as claimed in claim 9, wherein said further switch is inserted in a power supply circuit for said electric motor, said movable contact is attached to said tone arm and in contact with said metal section during the playing of the record and in contact with said insulated section when said needle carried by said phono pick-up has reached the end of said sound groove in said record, the first lever is connected at its lower end with one end of an over center spring having its other end secured to the supporting frame, and said record centering collar is provided with an end flange preventing said record from wandering out of true and from vibrating, even when said portable phonograph is tilted during operation.

11. A record playing device comprising:

(a) a fixed support, (b) a turntable journalled on said fixed support for rotation, (c) driving means in operative engagement with said turntable, (d) a record gripping and centering member, (e) means mounting said member on said fixed support for rotation away from said turntable into an inoperative position in which said member is spaced from said turntable so that a record may be placed on or removed from said turntable, and for rotation toward said turntable into an operative position in which said member holds a record on said turntable, (f) a tone arm carrying sound reproducing means at one end, (g) means at the other end of said tone arm fixing said tone arm to said member for rotation therewith, said sound reproducing means moving into playing contact with said record when said member is rotated into said operative position, (h) said fixing means including means mounting said tone arm for rotation in a plane parallel to said turntable when said member is in said operative position, and enabling said tone arm to rotate so that said sound reproducing means is moved to a point adjacent the edge of said turntable when said member is rotated into said inoperative position, (i) a lever connected to said means mounting said member, said lever extending to a point adjacent said turntable when said member is in said inoperative position so that a record being placed on said turntable pushes said lever and thereby rotates said member into said operative position.

12. A record playing device, comprising a fixed support; a turntable journalled on said support for rotation; driving means in operative engagement with said turntable; a record gripping and centering member; mounting means mounting said member on said support for movement away from said turntable to an inoperative position in which said member is spaced from said turntable so that a record may be placed onto or removed from the turntable, and for movement toward said turntable to an operative position in which said member holds a record on said turntable; a tone arm carrying sound reproducing means; fixing means for fixing said tone arm to said member for movement therewith, said sound reproducing means moving into playing contact with the record on said turntable when said member is moved to operative position and said fixing means including means mounting said tone arm for rotation in a plane parallel to said turntable when said member is in operative position and enabling said tone arm to rotate so that said sound reproducing means is moved to a predetermined position out of playing contact with the record on said turntable when said member is moved to inoperative position; and displaceable motion transmitting means connected to said mounting means and extending to a point adjacent said turntable when said member is in inoperative position so that a record being placed onto said turntable pushes said motion transmitting means and thereby displaces said member to operative position.

13. A phonograph record player, comprising a case having a slot-like opening for receiving a record to be played; a fixed support mounted in said case; a turntable journalled on said support for rotation in a plane parallel to the length of said opening; driving means in operative engagement with said turntable; a sound reproducing system within said case and including a tone arm; a movable support mounted on said fixed support for movement between first and second positions, said tone arm being mounted on said movable support for movement therewith toward said turntable in response to movement of said movable support from first to second position and angular movement parallel to said turntable; a record gripping and centering member resiliently mounted on said movable support for movement toward the center of said turntable in response to movement of said movable support from first to second position; and an operating member secured to said movable support and extending in the first position of said movable support to a point adjacent the periphery of said turntable and into the path of a record being placed in playing position onto said turntable to move said movable support to second position in response to placing of a record onto said turntable.

References Cited

UNITED STATES PATENTS

| | | | |
|---|---|---|---|
| 2,552,757 | 5/1951 | Adler | 274—2 |
| 3,234,687 | 2/1966 | Elwell | 274—1.1 XR |
| 3,292,932 | 12/1966 | Wolf | 274—1.1 XR |

FOREIGN PATENTS

| | | |
|---|---|---|
| 869,376 | 1961 | Great Britain. |

HARRY N. HAROIAN, *Primary Examiner.*

U.S. Cl. X.R.

274—2, 9